US012567917B2

(12) United States Patent
Zhang et al.

(10) Patent No.: US 12,567,917 B2
(45) Date of Patent: Mar. 3, 2026

(54) DATA TRANSMISSION METHOD, APPARATUS, AND SYSTEM, AND COMPUTER-READABLE STORAGE MEDIUM

(71) Applicant: HUAWEI TECHNOLOGIES CO., LTD., Shenzhen (CN)

(72) Inventors: Chengmin Zhang, Dongguan (CN); Xianwen Qiu, Dongguan (CN); Jianqiang Liu, Dongguan (CN); Xiang He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 18/243,227

(22) Filed: Sep. 7, 2023

(65) Prior Publication Data

US 2024/0089020 A1 Mar. 14, 2024

(30) Foreign Application Priority Data

Sep. 8, 2022 (CN) .......................... 202211096662.4

(51) Int. Cl.
*H04J 3/04* (2006.01)
(52) U.S. Cl.
CPC .................................. *H04J 3/047* (2013.01)
(58) Field of Classification Search
CPC ...... H04J 2203/0085; H04J 3/047; H04J 3/16; H04L 25/14

(Continued)

(56) References Cited

U.S. PATENT DOCUMENTS 10,158,686 B2 * 12/2018 Gustlin ................. H04L 49/352
2013/0083810 A1 4/2013 Ghiasi et al.
(Continued)

FOREIGN PATENT DOCUMENTS

EP 2999152 A1 3/2016
EP 3996330 A1 5/2022

OTHER PUBLICATIONS

IEEE Computer Society: "IEEE Standard for Ethernet Amendment 10: Media Access Control Parameters, Physical Layers, and Management Parameters for 200 Gb/s and 400 Gb/s Operation." IEEE 3 Park Avenue New York, NY 10016-5997. IEEE Std 802.3bs™— 2017. total 372 pages.

(Continued)

*Primary Examiner* — Robert J Lopata
(74) *Attorney, Agent, or Firm* — WOMBLE BOND DICKINSON (US) LLP

(57) ABSTRACT

This application discloses a data transmission method. The method includes: performs bit multiplexing to obtain a plurality of third data streams based on a plurality of first data streams and a plurality of second data streams, where the first data stream and the second data stream belong to different virtual lane groups; and transmits the plurality of third data streams to a second module, to enable the second module to obtain a plurality of fourth data streams based on the plurality of third data streams, where any fourth data stream is obtained by performing bit multiplexing on any second quantity of third data streams in the plurality of third data streams. Bit multiplexing is performed on the obtained data streams, so that the method can improve a transmission rate of the data stream and reduce a frame loss ratio of a system.

20 Claims, 8 Drawing Sheets

101

(58) Field of Classification Search
USPC ........................................................ 370/329
See application file for complete search history.

(56) References Cited

U.S. PATENT DOCUMENTS

| | | | | |
|---|---|---|---|---|
| 2015/0222379 A1* | 8/2015 | Hauenschild | ......... | H04J 3/0685 |
| | | | | 370/518 |
| 2017/0099101 A1* | 4/2017 | Pepper | ................ | H04B 10/801 |
| 2017/0302484 A1* | 10/2017 | Yang | ..................... | H04L 12/433 |
| 2018/0076925 A1* | 3/2018 | Neal | ..................... | H04L 1/0041 |
| 2019/0140861 A1* | 5/2019 | Zhong | ................... | H04J 3/1658 |
| 2023/0353255 A1* | 11/2023 | Ding | ....................... | H04Q 11/00 |
| 2024/0223215 A1* | 7/2024 | Yan | ........................ | H04L 1/0065 |
| 2025/0125906 A1* | 4/2025 | Huang | ................ | H04L 1/0065 |

OTHER PUBLICATIONS

LAN/MAN Standards Committee of the IEEE Computer Society: "IEEE P802.3ck™M/D3.3 Draft Standard for Ethernet Amendment 4: Physical Layer Specifications and Management Parameters for 100 Gb/s, 200 Gb/s, and 400 Gb/s Electrical Interfaces Based on 100 Gb/s Signaling." IEEE P802.3ck™M/D3.3, Jun. 10, 2022. total 325 pages.
ETC: "800G-ETC-R: An Ethernet Physical Coding Sublayer based on Clause 119 of IEEE Std 802.3, operating at a data rate of 800 Gb/s." Copyright © Ethernet Technology Consortium Members 2014-2021. All Rights Reserved. Oct. 18, 2021. total 22 pages.

* cited by examiner

101

DATA TRANSMISSION METHOD, APPARATUS, AND SYSTEM, AND COMPUTER-READABLE STORAGE MEDIUM

CROSS-REFERENCE TO RELATED APPLICATIONS

This application claims priority to Chinese Patent Application No. 202211096662.4, filed on Sep. 8, 2022, which is hereby incorporated by reference in its entirety.

TECHNICAL FIELD

This application relates to the field of communication technologies, and in particular, to a data transmission method, apparatus, and system, and a computer-readable storage medium.

BACKGROUND

With development of communication technologies, a requirement for a data transmission rate is increasingly high. Therefore, a data transmission method is required to achieve a higher transmission rate.

SUMMARY

This application provides a data transmission method, apparatus, and system, and a computer-readable storage medium, to perform data transmission at a high transmission rate.

According to a first aspect, a data transmission method is provided. The method includes: A first module obtains a plurality of first data streams and a plurality of second data streams, where the first data stream and the second data stream are transmitted through virtual lanes belonging to different virtual lane groups; obtains a plurality of third data streams based on the plurality of first data streams and the plurality of second data streams, where any third data stream is obtained by performing bit multiplexing (bit multiplexing, bit mux) on a first quantity of first data streams in the plurality of first data streams and a first quantity of second data streams in the plurality of second data streams; and transmits the plurality of third data streams to a second module, to enable the second module to obtain a plurality of fourth data streams based on the plurality of third data streams, where any fourth data stream is obtained by performing bit multiplexing on any second quantity of third data streams in the plurality of third data streams.

In the method, bit multiplexing is performed on the obtained first data streams and the obtained second data streams, so that the third data stream with a high transmission rate can be obtained, and data is transmitted at a high transmission rate. In addition, the third data stream is transmitted to the second module, so that the second module performs bit multiplexing on the third data stream. In the method, the fourth data stream with a high transmission rate can be obtained, that is, a data transmission rate is further improved, and data is transmitted at a high transmission rate.

In addition, bit multiplexing is separately performed based on the first module and the second module to improve the data transmission rate. A transmission rate of a lane of the first module may be low. In this case, the method can be applied to a chip with a lane with a low transmission rate.

In addition, because the first data streams and the second data streams for obtaining the third data streams are transmitted through the virtual lanes belonging to the different virtual lane groups, the second module can directly perform bit multiplexing on any second quantity of third data streams to obtain the fourth data stream. When it is ensured that the plurality of data streams used to obtain the fourth data stream are from a plurality of virtual lane groups, high error correction performance and a low frame loss ratio are achieved, design complexity of the second module is low, and a delay is also low.

In an embodiment, the obtaining a plurality of third data streams based on a plurality of first data streams and a plurality of second data streams includes: performing bit multiplexing on an $i^{th}$ first data stream in the plurality of first data streams and an $i^{th}$ second data stream in the plurality of second data streams to obtain one third data stream, where $0 \le i < A$, i is an integer, A is a quantity of first data streams, and a quantity of second data streams is the same as the quantity of first data streams. Bit multiplexing is performed on the plurality of first data streams and the plurality of second data streams based on a one-to-one correspondence with sequence numbers. When bit demultiplexing is subsequently performed on the plurality of third data streams to obtain the plurality of first data streams and the plurality of second data streams, a sequence of the first data streams and a sequence of the second data streams may be determined based on a sequence of the third data streams. A manner of determining the sequence of the first data streams and the sequence of the second data streams is simple.

In an embodiment, the obtaining a plurality of third data streams based on a plurality of first data streams and a plurality of second data streams includes: performing bit multiplexing on an $i^{th}$ first data stream in the plurality of first data streams and a $j^{th}$ second data stream in the plurality of second data streams to obtain one third data stream, where $0 \le i < A$, $0 \le j < A$, i is not equal to j, both i and j are integers, A is a quantity of first data streams, and a quantity of second data streams is the same as the quantity of first data streams. Compared with performing bit multiplexing on the plurality of first data streams and the plurality of second data streams based on a one-to-one correspondence with sequence numbers, a case in which bit multiplexing is performed on the first data streams and the second data streams is more flexible in this manner.

In an embodiment, a sum of transmission rates of the plurality of fourth data streams is equal to a reference rate. In the method, the sum of the transmission rates of the plurality of fourth data streams may be equal to a high reference rate, to achieve a high transmission rate.

In an embodiment, the reference rate is 800 gigabits per second (gigabit per second, Gb/s).

In an embodiment, each of the virtual lane groups for transmitting the plurality of first data streams and the plurality of second data streams is a 400 G physical coding sublayer (physical coding sublayer, PCS) lane group. The method is applicable to current standards related to the 400 G PCS lane group, and research and development costs are low.

In an embodiment, a transmission rate of the third data stream is 50 G, and the transmission rate of the fourth data stream is 100 G. Therefore, the first module may be a chip with a lane with a low transmission rate, for example, a chip with a first module of 50 G/lane (lane).

According to a second aspect, a data transmission method is provided. The method includes: A second module receives a plurality of third data streams transmitted by a first module, where any third data stream is obtained by performing bit multiplexing on a first quantity of first data streams in a plurality of first data streams and a first quantity of second data streams in a plurality of second data streams, and the first data stream and the second data stream are transmitted through virtual lanes belonging to different virtual lane groups. The second module obtains a plurality of fourth data streams based on the plurality of third data streams, where any fourth data stream is obtained by performing bit multiplexing on any second quantity of third data streams in the plurality of third data streams.

The fourth data stream is obtained by performing bit multiplexing on the third data streams. In the method, the fourth data stream with a high transmission rate can be obtained, so that a data transmission rate can be improved, and data can be transmitted at a high transmission rate. In addition, because the first data streams and the second data streams for obtaining the third data streams are transmitted through the virtual lanes belonging to the different virtual lane groups, the second module can directly perform bit multiplexing on any second quantity of third data streams to obtain the fourth data stream. When it is ensured that the plurality of data streams used to obtain the fourth data stream are from a plurality of virtual lane groups, high error correction performance and a low frame loss ratio are achieved, design complexity of the second module is low, and a delay is also low.

According to a third aspect, a data transmission apparatus is provided. The apparatus is used in a first module, and the apparatus includes an obtaining unit, a multiplexing unit, and a transmission unit. The obtaining unit is configured to obtain a plurality of first data streams and a plurality of second data streams, where the first data stream and the second data stream are transmitted through virtual lanes belonging to different virtual lane groups. The multiplexing unit is configured to obtain a plurality of third data streams based on the plurality of first data streams and the plurality of second data streams, where any third data stream is obtained by performing bit multiplexing on a first quantity of first data streams in the plurality of first data streams and a first quantity of second data streams in the plurality of second data streams. The transmission unit is configured to transmit the plurality of third data streams to a second module, to enable the second module to obtain a plurality of fourth data streams based on the plurality of third data streams, where any fourth data stream is obtained by performing bit multiplexing on any second quantity of third data streams in the plurality of third data streams.

In an embodiment, the multiplexing unit is configured to perform bit multiplexing on an $i^{th}$ first data stream in the plurality of first data streams and an $i^{th}$ second data stream in the plurality of second data streams to obtain one third data stream, where $0 \leq i < A$, i is an integer, A is a quantity of first data streams, and a quantity of second data streams is the same as the quantity of first data streams.

In an embodiment, the multiplexing unit is configured to perform bit multiplexing on an $i^{th}$ first data stream in the plurality of first data streams and a $j^{th}$ second data stream in the plurality of second data streams to obtain one third data stream, where $0 \leq i < A$, $0 \leq j < A$, i is not equal to j, both i and j are integers, A is a quantity of first data streams, and a quantity of second data streams is the same as the quantity of first data streams.

In an embodiment, a sum of transmission rates of the plurality of fourth data streams is equal to a reference rate.

In an embodiment, the reference rate is 800 G.

In an embodiment, each of the virtual lane groups for transmitting the plurality of first data streams and the plurality of second data streams is a 400 G PCS lane group.

In an embodiment, a transmission rate of the third data stream is 50 G, and the transmission rate of the fourth data stream is 100 G.

According to a fourth aspect, a data transmission apparatus is provided. The apparatus is used in a second module, and the apparatus includes a receiving unit and a multiplexing unit. The receiving unit is configured to receive a plurality of third data streams transmitted by a first module, where any third data stream is obtained by performing bit multiplexing on a first quantity of first data streams in the plurality of first data streams and a first quantity of second data streams in a plurality of second data streams, and the first data stream and the second data stream are transmitted through virtual lanes belonging to different virtual lane groups. The multiplexing unit is configured to obtain a plurality of fourth data streams based on the plurality of third data streams, where any fourth data stream is obtained by performing bit multiplexing on any second quantity of third data streams in the plurality of third data streams.

According to a fifth aspect, a data transmission system is provided. The data transmission system includes a first module and a second module. The first module is configured to perform any data transmission method in the first aspect, and the second module is configured to perform the data transmission method in the second aspect.

According to a sixth aspect, a computer system is provided. The computer system includes a processor. When the processor executes program instructions or code, the computer system implements any data transmission method in the first aspect or the second aspect. For example, the computer system further includes a memory, and the memory is configured to store the program instructions or the code.

According to a seventh aspect, a computer-readable storage medium is provided. The computer-readable storage medium stores at least one program instruction or code, and when the program instruction or the code is executed by a computer, the computer implements any data transmission method in the first aspect or the second aspect.

According to an eighth aspect, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform any data transmission method in the first aspect or the second aspect.

For example, there are one or more processors, and there are one or more memories.

For example, the memory and the processor may be integrated together, or the memory and the processor are disposed separately.

In an example process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this application.

According to a ninth aspect, a computer program product is provided. The computer program product includes: computer program instructions or code. When the computer program instructions or the code is run by a computer, the computer is enabled to perform any data transmission method in the first aspect or the second aspect.

According to a tenth aspect, a chip is provided. The chip includes a processor, and the processor is configured to run program instructions or code, to enable a device including the chip to perform any data transmission method in the first aspect or the second aspect.

For example, the chip further includes an input interface, an output interface, and a memory; the input interface, the output interface, the processor, and the memory are connected through an internal connection path; and the memory is configured to store the program instructions or the code.

It should be understood that, for beneficial effects achieved by the technical solutions of the third aspect to the tenth aspect and corresponding embodiments of the technical solutions of the third aspect to the tenth aspect of this application, refer to the technical effects of the first aspect, the second aspect, and the corresponding embodiments of the first aspect and the second aspect. Details are not described herein again.

DESCRIPTION OF EMBODIMENTS

Terms used in implementations of this application are only used to explain example embodiments of this application, and are not intended to limit this application. The following describes embodiments of this application with reference to the accompanying drawings.

With the development of communication technologies, a data transmission rate is continuously improved. Currently, the Institute of Electrical and Electronics Engineers (Institute of Electrical and Electronics Engineers, IEEE) 802.3 has completed Ethernet interface standards of 200 gigabit Ethernet (gigabit Ethernet, GbE) and a rate of 400 GbE. In an 800 G Ethernet specification released by the Ethernet Technology Consortium (Ethernet Technology Consortium, ETC), a manner is proposed to support a single media access control (media access control, MAC) running at 800 G and achieve a rate of 800 GbE by using two groups of 400 G PCSs in parallel to form an 800 GbE PCS.

Figure 1:
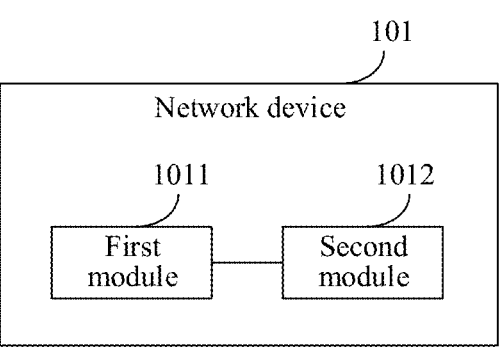
FIG. 1 is a schematic diagram of an example scenario of a data transmission method according to an embodiment of this application.

An embodiment of this application provides a data transmission method, to implement data transmission with high error correction performance and a low frame loss ratio. The data transmission method provided in this embodiment of this application may be applied to a computer system. For example, the computer system is a network device 101 shown in FIG. 1. The network device 101 includes a first module 1011 and a second module 1012. The first module 1011 and the second module 1012 are communicatively connected. For example, after receiving data sent by the first module 1011, the second module 1012 transmits the data to a network device other than the network device 101, to implement data transmission between the network device 101 and the another network device.

In an embodiment, the first module 1011 is a host chip (host chip) in the network device 101, and the second module 1012 is a module or chip other than the host chip. For example, the second module 1012 is an optical module or a clock data recovery (clock data recovery, CDR) chip other than the host chip. The data transmission between the first module 1011 and the second module 1012 may be chip to module (chip to module, C2M) data transmission or chip to chip (chip to chip, C2C) data transmission.

The first module 1011 and the second module 1012 may be communicatively connected through a plurality of physical lanes (physical lanes). The physical lanes include but are not limited to an attachment unit interface (attachment unit interface, AUI) and a physical media dependent (physical media dependent, PMD) layer. For example, the first module 1011 and the second module 1012 are communicatively connected through 16 physical lanes, and a transmission rate of a data stream transmitted through any physical lane is 50 G. An example scenario shown in FIG. 1 may further include another module. This is not limited in this embodiment of this application.

It should be noted that, the transmission rate of the data stream mentioned in this embodiment of this application may correspond to a transmission rate when overheads are included. For example, in this embodiment of this application, if the transmission rate of the data stream is 50 G, 50 G indicates a transmission rate of net data, and also corresponds to 53.125 G when the overheads are included. If the transmission rate of the data stream is 100 G, 100 G indicates the transmission rate of the net data, and also corresponds to 106.25 G when the overheads are included.

Figure 2:
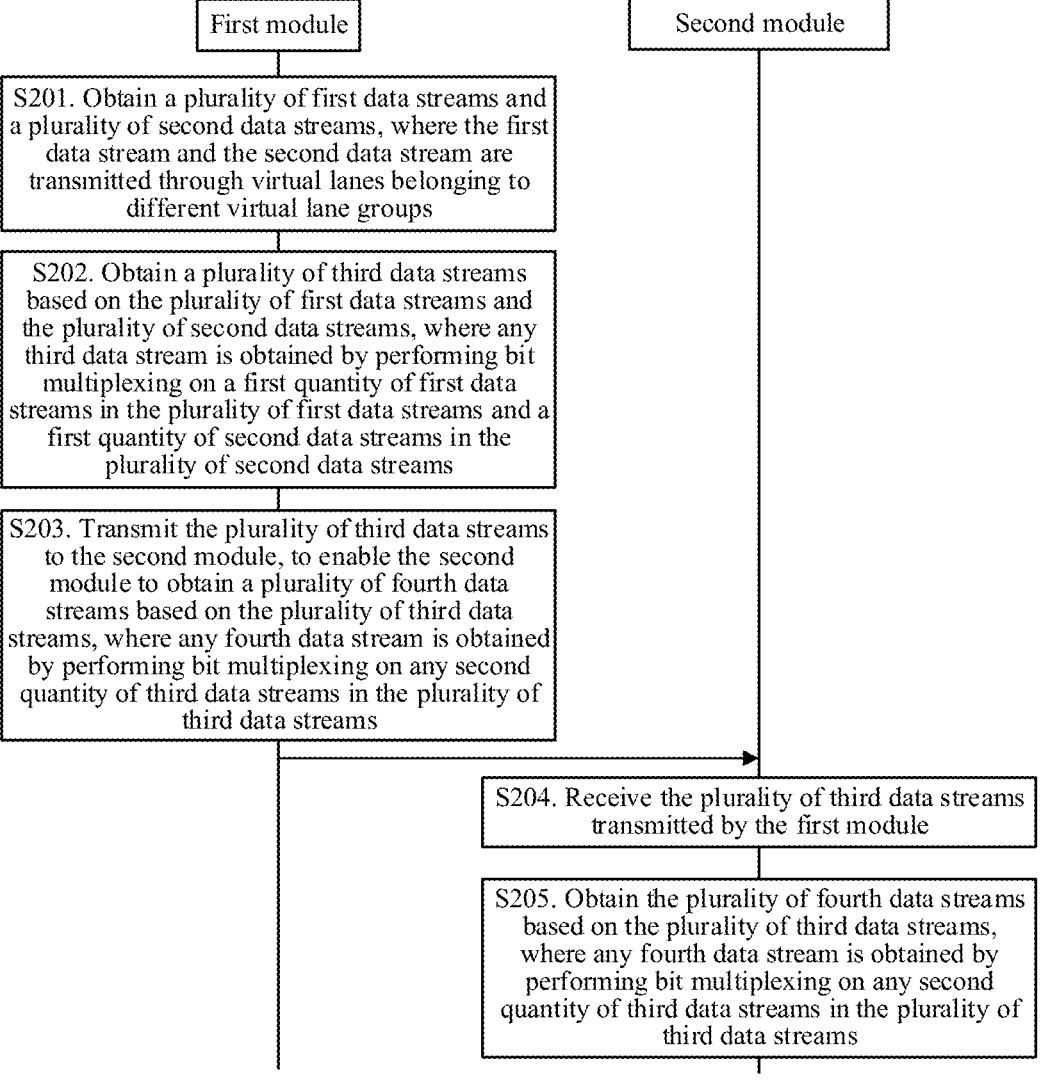
FIG. 2 is a flowchart of a data transmission method according to an embodiment of this application.

The data transmission method provided in this embodiment of this application may be shown in FIG. 2. The following describes the data transmission method provided in this embodiment of this application with reference to the example scenario shown in FIG. 1. As shown in FIG. 2, the method includes but is not limited to S201 to S203.

S201. A first module obtains a plurality of first data streams and a plurality of second data streams, where the first data stream and the second data stream are transmitted through virtual lanes belonging to different virtual lane groups.

For example, the virtual lane (virtual lane) is a PCS lane or a forward error correction (forward error correction, FEC) lane, and the virtual lane group is a PCS lane group or an FEC lane group.

In an embodiment, the obtaining a plurality of first data streams and a plurality of second data streams includes: encoding data from a media independent interface (media independent interface, MII) to obtain a plurality of code blocks, and distributing the plurality of code blocks to two PCS flows (flows) in polling mode, where one PCS flow corresponds to one PCS lane group, and one PCS lane group includes a plurality of PCS lanes; processing a plurality of code blocks distributed to a first PCS flow, and distributing processed data to a PCS lane group corresponding to the first PCS flow, to obtain a plurality of first data streams, where one first data stream is transmitted through one PCS lane in the PCS lane group, and the first PCS flow is either of the two PCS flows; and processing a plurality of code blocks distributed to a second PCS flow, and distrusting processed data to a PCS lane group corresponding to the second PCS flow, to obtain a plurality of second data streams, where one second data stream is transmitted through one PCS lane in the PCS lane group, and the second PCS flow is the other PCS flow than the first PCS flow in the two PCS flows.

In this embodiment of this application, the data from the MII may be data transmitted by a single MAC running at a reference rate through a reconciliation sublayer (reconciliation sublayer, RS) and the MII. Therefore, a sum of transmission rates of the plurality of first data streams and the plurality of second data streams is the reference rate. For example, the reference rate is any one of 200 G, 400 G, or 800 G. In this embodiment of this application, a manner of encoding the data from the MII may be 64-bit (bit, B)/66 B coding. When the plurality of code blocks are distributed to the two PCS flows in polling mode, rate matching (rate matching) may be first performed on the plurality of code blocks, and then the plurality of rate-matched code blocks are distributed to the two PCS flows in polling mode.

For example, the foregoing processing performed on the plurality of code blocks distributed to the PCS flow includes PCS processing. For example, the first module performs the PCS processing on the plurality of code blocks distributed to the first PCS flow, and performs the PCS processing on the plurality of code blocks distributed to the second PCS flow. The PCS processing includes but is not limited to transcoding, scrambling, alignment marker (alignment marker, AM) insertion, and FEC coding. For details about the PCS processing, refer to relevant content of the ETC-800 G standard and the IEEE 802.3 standard. Details are not described herein.

In an embodiment, each PCS flow is a PCS flow corresponding to 800 GbE, the PCS flow corresponding to 800 GbE includes two groups of 400 G PCS flows, and each of the virtual lane groups for transmitting the plurality of first data streams and the plurality of second data streams is a 400 G PCS lane group. For example, a 400 G PCS lane group corresponding to each group of 400 G PCS flows includes 16 PCS lanes, and a transmission rate of each PCS lane is 25 G. In this embodiment of this application, a lane whose transmission rate is 25 G is referred to as a lane of 25 G/lane. In other words, each first data stream and each second data stream may be transmitted through the lane of 25 G/lane, and the lane of 25 G/lane for transmitting the first data stream and the lane of 25 G/lane for transmitting the second data stream belong to different 400 G PCS lane groups.

S202. The first module obtains a plurality of third data streams based on the plurality of first data streams and the plurality of second data streams, where any third data stream is obtained by performing bit multiplexing on a first quantity of first data streams in the plurality of first data streams and a first quantity of second data streams in the plurality of second data streams.

In an embodiment, a quantity of obtained first data streams and a quantity of obtained second data streams are the same. For example, a transmission rate of the virtual lane for transmitting the first data stream is the same as that of the virtual lane for transmitting the second data stream. The first quantity is determined based on a ratio of a first rate to a second rate. The first rate is a transmission rate of a lane for transmitting the third data stream, and the second rate is the transmission rate of the virtual lane for transmitting the first data stream, and is also the transmission rate of the virtual lane for transmitting the second data stream. For example, the first rate is 50 G and the second rate is 25 G. In this case, the first quantity is 1. For example, when the first rate is 50 G and the second rate is 25 G, one third data stream is obtained by performing bit multiplexing on one of the plurality of first data streams and one of the plurality of second data streams. In this case, the transmission rates of both the first data stream and the second data stream are 25 G, and a transmission rate of the third data stream is 50 G. In this embodiment of this application, the third data stream may be transmitted through a physical lane.

For example, a manner of obtaining the plurality of third data streams based on the plurality of first data streams and the plurality of second data streams includes the following manner 1 or manner 2.

Manner 1. Bit multiplexing is performed on an $i^{th}$ first data stream in the plurality of first data streams and an $i^{th}$ second data stream in the plurality of second data streams to obtain one third data stream, where $0 \le i < A$, i is an integer, and A is the quantity of first data streams.

It should be noted that, i mentioned in this embodiment of this application indicates an example data stream in a plurality of data streams. A value range of i is not intended to limit a numbering manner of the plurality of data streams, but is intended to limit the first data stream and the second data stream on which bit multiplexing is performed being a first data stream and a second data stream that are at a same position in the plurality of first data streams and the plurality of second data streams. The value range of i may correspond to a plurality of numbering manners. For example, if 16 first data streams and 16 second data streams are all numbered from 0 to 15, the value range of i is represented as $0 \le i < 16$. If 16 first data streams and 16 second data streams are numbered from 1 to 16, the value range of i is represented as $1 \le i \le 16$.

In an embodiment, an operation of performing bit multiplexing on the $i^{th}$ first data stream and the $i^{th}$ second data stream to obtain one third data stream is performed at a physical medium attachment sublayer (PMA). A specific manner of performing bit multiplexing on the $i^{th}$ first data stream and the $i^{th}$ second data stream to obtain one third data stream is not limited in this embodiment of this application, provided that the third data stream can be obtained.

Because the first data stream and the second data stream are transmitted through the virtual lanes belonging to the different virtual lane groups, bit multiplexing is performed on the $i^{th}$ first data stream and the $i^{th}$ second data stream, so that each third data stream is obtained by two data streams transmitted through virtual lanes belonging to different virtual lane groups. In addition, in this embodiment of this application, bit multiplexing is performed on the plurality of first data streams and the plurality of second data streams based on a one-to-one correspondence with sequence numbers. In this way, when bit demultiplexing is subsequently performed on the plurality of third data streams to obtain the plurality of first data streams and the plurality of second data streams, a sequence of the first data streams and a sequence of the second data streams may be determined based on a sequence of the third data streams. A manner of determining the sequence of the first data streams and the sequence of the second data streams is simple.

Figure 3:
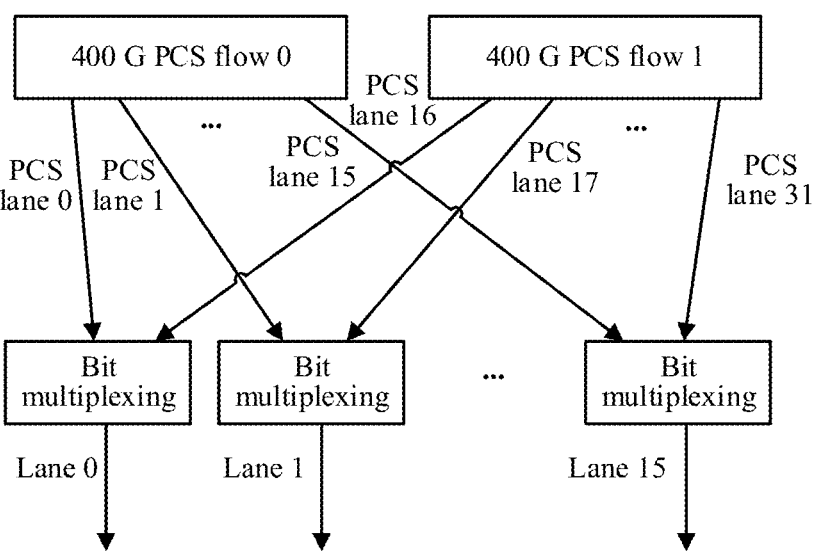
FIG. 3 is a schematic diagram of a process of obtaining a third data stream according to an embodiment of this application.

FIG. 3 is a schematic diagram of a process of obtaining a third data stream according to an embodiment of this application. Refer to FIG. 3. 16 first data streams are obtained based on a 400 G PCS flow 0. The 16 first data streams are separately transmitted through a PCS lane 0 to a PCS lane 15, and each of the PCS lane 0 to the PCS lane 15 is a lane of 25 G/lane. In other words, when $0 \leq i < 16$, an $i^{th}$ first data stream in the 16 first data streams is transmitted through a PCS lane s in the PCS lane 0 to the PCS lane 15, where s=i. 16 second data streams are obtained based on a 400 G PCS flow 1. The 16 second data streams are separately transmitted through a PCS lane 16 to a PCS lane 31, and each of the PCS lane 16 to the PCS lane 31 is a lane of 25 G/lane. In other words, when $0 \leq i < 16$, an $i^{th}$ second data stream in the 16 second data streams is transmitted through a PCS lane k in the PCS lane 16 to the PCS lane 31, where k=i+16.

As shown in FIG. 3, bit multiplexing is performed on the first data stream transmitted through the PCS lane 0 and the second data stream transmitted through the PCS lane 16, to obtain one third data stream. A lane for transmitting the third data stream is a lane 0 of 50 G/lane. Bit multiplexing is performed on the first data stream transmitted through the PCS lane 1 and the second data stream transmitted through the PCS lane 17, to obtain one third data stream. A lane for transmitting the third data stream is a lane 1 of 50 G/lane. A principle of a process of obtaining another third data stream is the same as that of the foregoing process, and details are not described herein again.

Manner 2. Bit multiplexing is performed on an $i^{th}$ first data stream in the plurality of first data streams and a $j^{th}$ second data stream in the plurality of second data streams to obtain one third data stream, where $0 \leq i < A$, $0 \leq j < A$, i is not equal to j, both i and j are integers, and A is the quantity of first data streams.

It should be noted that, a principle of a value range of i described in the manner 2 is the same as that described in the foregoing manner 1, and i and j are used to indicate example data streams in a plurality of data streams. Value ranges of i and j are not intended to limit numbering manners of the plurality of data streams, but are intended to limit the first data stream and the second data stream on which bit multiplexing is performed being a first data stream and a second data stream that are at different positions in the plurality of first data streams and the plurality of second data streams. The value ranges of i and j may correspond to a plurality of numbering manners. For example, if 16 first data streams and 16 second data streams are all numbered from 0 to 15, the value range of i is represented as $0 \leq i < 16$, and the value range of j is represented as $0 \leq j < 16$. If 16 first data streams and 16 second data streams are all numbered from 1 to 16, the value range of i is represented as $1 \leq i \leq 16$, and the value range of j is represented as $1 \leq j \leq 16$.

Compared with the foregoing manner 1 in which bit multiplexing is performed on the plurality of first data streams and the plurality of second data streams to obtain the plurality of third data streams based on the one-to-one correspondence with the sequence numbers, a case in which bit multiplexing is performed on the first data stream and the second data stream in the manner 2 is more flexible. In addition, each third data stream is also obtained from two data streams transmitted through virtual lanes belonging to different virtual lane groups.

Similar to the manner 1, an operation of performing bit multiplexing on the $i^{th}$ first data stream and the $j^{th}$ second data stream to obtain one third data stream may be performed at the PMA. A specific manner of performing bit multiplexing on the $i^{th}$ first data stream and the $j^{th}$ second data stream to obtain one third data stream is not limited in this embodiment of this application, provided that the third data stream can be obtained.

S203. The first module transmits the plurality of third data streams to the second module, so that the second module obtains a plurality of fourth data streams based on the plurality of third data streams, where any fourth data stream is obtained by performing bit multiplexing on any second quantity of third data streams in the plurality of third data streams.

In an embodiment, the first module transmits the plurality of third data streams to the second module through a plurality of physical lanes, where one physical lane is used to transmit one third data stream. The physical lanes include but are not limited to an AUI and a PMD. The first module and the second module may be located in different chips. For example, the first module is a first chip, the first chip is a host chip, and the second module is an optical module located in a second chip, or the second module is a CDR chip. The plurality of third data streams are transmitted to the second module, so that the second module may obtain the plurality of fourth data streams based on the plurality of third data streams. For a process in which the second module obtains the plurality of fourth data streams, refer to related descriptions in S205 below. This is not described herein.

In the method provided in this embodiment of this application, bit multiplexing is performed on the obtained first data streams and the obtained second data streams, so that the third data stream with a high transmission rate can be obtained, and data is transmitted at a high transmission rate. In addition, the third data stream is transmitted to the second module, so that the second module performs bit multiplexing on the third data stream. In the method, the fourth data stream with a high transmission rate can be obtained, that is, a data transmission rate is further improved, and data is transmitted at a high transmission rate.

In addition, in the method provided in this embodiment of this application, bit multiplexing is separately performed based on the first module and the second module to improve the data transmission rate. A transmission rate of a lane of the first module may be low. In this case, the method can be applied to a chip with a lane with a low transmission rate. For example, the method is applicable to chips using 50 G/lane signaling.

The foregoing uses a first module side as an example to describe the data transmission method provided in embodiments of this application. The following uses a second module side as an example to describe the data transmission method. As shown in FIG. 2, the data transmission method includes but is not limited to S204 and S205.

S204. The second module receives the plurality of third data streams transmitted by the first module, where any third data stream is obtained by performing bit multiplexing on the first quantity of first data streams in the plurality of first data streams and the first quantity of second data streams in the plurality of second data streams, and the first data stream and the second data stream are transmitted through virtual lanes belonging to the different virtual lane groups.

In an embodiment, the second module receives, through a plurality of physical lanes, the plurality of third data streams transmitted by the first module, where one third data stream is received through one physical lane.

For example, based on the content in S202, the plurality of received third data streams include the following two cases.

Case 1: The plurality of third data streams are obtained by separately performing bit multiplexing on the $i^{th}$ first data stream in the plurality of first data streams and the $i^{th}$ second data stream in the plurality of second data streams, where $0 \le i < A$, i is an integer, A is the quantity of first data streams, and the quantity of second data streams is the same as the quantity of first data streams. In other words, the plurality of third data streams are the plurality of third data streams obtained in the manner 1 in S202.

Case 2: The plurality of third data streams are obtained by separately performing bit multiplexing on the $i^{th}$ first data stream in the plurality of first data streams and the $j^{th}$ second data stream in the plurality of second data streams, where $0 \le i < A$, $0 \le j < A$, i is not equal to j, both i and j are integers, A is the quantity of first data streams, and the quantity of second data streams is the same as the quantity of first data streams. In other words, the plurality of third data streams are the plurality of third data streams obtained in the manner 2 in S202.

S205. The second module obtains the plurality of fourth data streams based on the plurality of third data streams, where any fourth data stream is obtained by performing bit multiplexing on any second quantity of third data streams in the plurality of third data streams.

In an embodiment, the second quantity is determined based on a ratio of a third rate to the first rate, the third rate is a transmission rate of a lane for transmitting the fourth data stream, and the first rate is the transmission rate of the lane for transmitting the third data stream.

For example, when the third rate is 100 G and the first rate is 50 G, the second quantity is 2. In other words, in this case, one fourth data stream is obtained by performing bit multiplexing on any two third data streams in the plurality of third data streams. The transmission rate of the third data stream is 50 G, and the transmission rate of the fourth data stream is 100 G. For another example, when the third rate is 200 G and the first rate is 50 G, the second quantity is 4. In other words, in this case, one fourth data stream is obtained by performing bit multiplexing on any four third data streams in the plurality of third data streams. The transmission rate of the third data stream is 50 G, and the transmission rate of the fourth data stream is 200 G. In this embodiment of this application, the fourth data stream may be transmitted through a physical lane.

Figure 4:
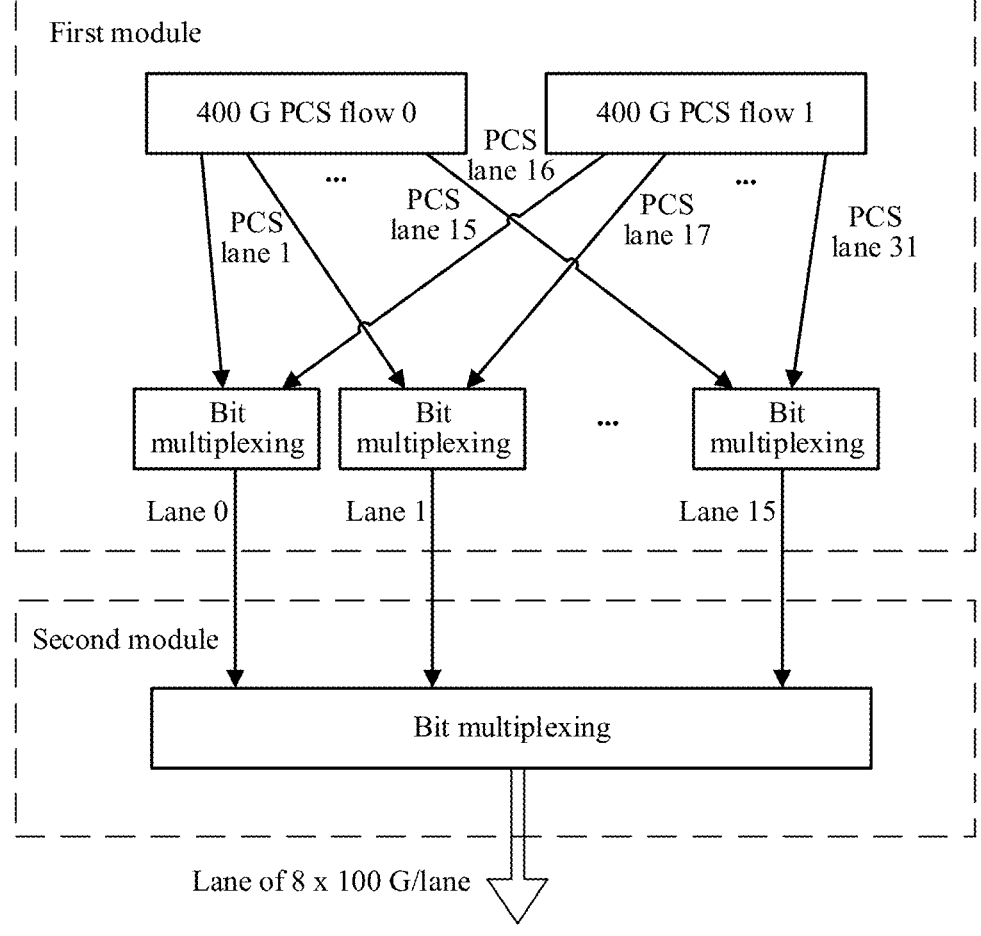
FIG. 4 is a schematic diagram of a process of obtaining a fourth data stream according to an embodiment of this application.

FIG. 4 is a schematic diagram of a process of obtaining a fourth data stream according to an embodiment of this application. Refer to FIG. 4. 16 third data streams obtained by the first module are separately transmitted through a lane 0 to a lane 15, and each of the lane 0 to the lane 15 is a lane of 50 G/lane. For a process in which the first module obtains the 16 third data streams, refer to related content in FIG. 3. Details are not described herein again. For the 16 obtained third data streams, the second module may perform bit multiplexing on any two third data streams to obtain one fourth data stream, so as to obtain a plurality of fourth data streams. As shown in FIG. 4, the second module obtains eight fourth data streams, the eight fourth data streams are separately transmitted through eight lanes of 100 G/lane, and a transmission rate of each fourth data stream is 100 G.

For example, an operation of performing bit multiplexing on any second quantity of third data streams to obtain one fourth data stream is performed at the PMA. A specific manner of performing bit multiplexing on any second quantity of third data streams to obtain one fourth data stream is not limited in this embodiment of this application, provided that the fourth data stream can be obtained. In this embodiment of this application, because the plurality of third data streams are obtained by performing bit multiplexing on the plurality of first data streams and the plurality of second data streams, a sum of transmission rates of the plurality of third data streams may be equal to a sum of transmission rates of the plurality of first data streams and the plurality of second data streams. The plurality of fourth data streams are obtained by performing bit multiplexing on the plurality of third data streams, and a sum of transmission rates of the plurality of fourth data streams may be equal to the sum of the transmission rates of the plurality of third data streams. That is, the sum of the transmission rates of the plurality of fourth data streams may be equal to a reference rate. For example, the reference rate may be 800 G.

The fourth data stream is obtained by performing bit multiplexing on the third data streams. According to the method provided in this embodiment of this application, the fourth data stream with a high transmission rate can be obtained, so that a data transmission rate can be improved, and data can be transmitted at a high transmission rate.

In this embodiment of this application, each third data stream is obtained from two data streams transmitted through virtual lanes belonging to different virtual lane groups. Therefore, regardless of third data streams, in the plurality of third data streams, on which bit multiplexing is performed to obtain a fourth data stream, the fourth data stream is obtained from data streams transmitted through virtual lanes belonging to different virtual lane groups.

For example, for a fourth data stream 1 in the plurality of fourth data streams, the fourth data stream 1 is obtained by performing bit multiplexing on a third data stream 1 and a third data stream 2 in the plurality of third data streams. The third data stream 1 is obtained by performing bit multiplexing on a first data stream 1 obtained based on the 400 G PCS flow 0 and a second data stream 1 obtained based on the 400 G PCS flow 1. The third data stream 2 is obtained by performing bit multiplexing on a first data stream 2 obtained based on the 400 G PCS flow 0 and a second data stream 2 obtained based on the 400 G PCS flow 1. For the fourth data stream 1, the fourth data stream 1 is obtained based on the first data stream 1 and the first data stream 2 that are obtained based on the 400 G PCS flow 0, and the second data stream 1 and the second data stream 2 that are obtained based on the 400 G PCS flow 1.

It can be learned from the content in S201 that a plurality of code blocks for obtaining the first data streams and the second data streams are from a same MAC. In addition, when the first data stream and the second data stream are obtained, FEC coding may be performed on the plurality of code blocks, and the first data stream and the second data stream are obtained based on a codeword obtained through FEC coding. After the fourth data stream is transmitted, when an error in a codeword cannot be corrected, that is, when the codeword is an uncorrectable codeword, compared with data transmission at a rate of 400 GbE, the uncorrectable codeword has greater impact on a MAC frame. For the impact of the uncorrectable codeword on the MAC frame, refer to the related description in FIG. 5 below.

Figure 5:
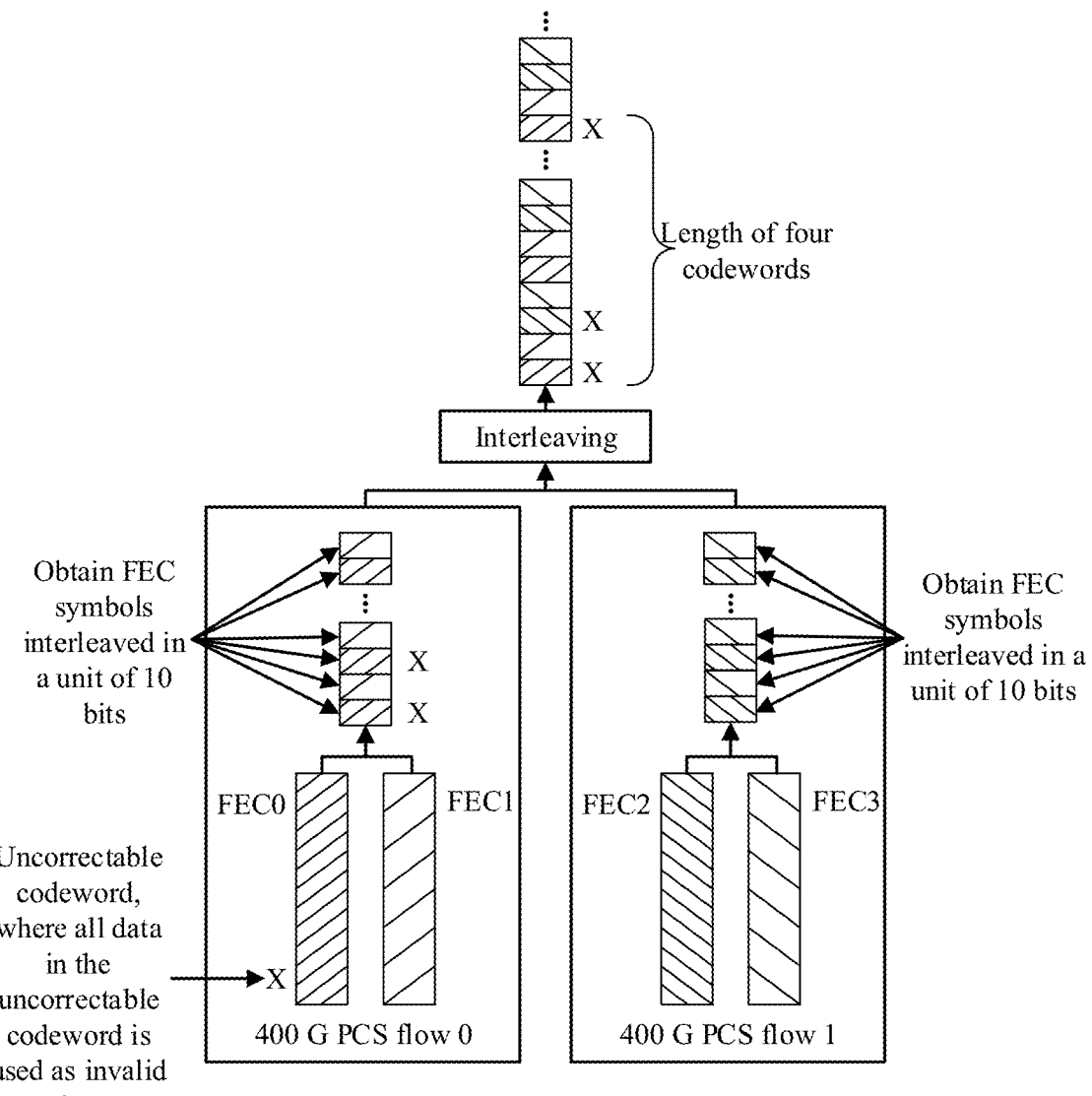
FIG. 5 is a schematic diagram of a data processing process according to an embodiment of this application.

FIG. 5 is a schematic diagram of a data processing process according to an embodiment of this application. As shown in FIG. 5, the 400 G PCS flow 0 corresponds to two groups of codewords: FEC0 and FEC1, and the 400 G PCS flow 1 corresponds to two groups of codewords: FEC2 and FEC3. For example, a codeword in FEC0 becomes an uncorrectable codeword after data transmission. All data in the uncorrectable codeword is used as unreliable data, and is marked (error marking) as invalid data in subsequent processing. The invalid data in FIG. 5 is represented as X. As shown in FIG. 5, FEC symbols interleaved in a unit of 10 bits are obtained based on FEC0 and FEC1, and FEC symbols interleaved in a unit of 10 bits are obtained based on FEC2 and FEC3. Further, the FEC symbols are further interleaved in a unit of 66 code blocks. In data obtained through interleaving, a range of the invalid data covers a length of four codewords, and the length of the four codewords corresponds to approximately 2560 bytes of data in the MAC. At 400 GbE, if a codeword is an uncorrectable codeword, approximately 1280 bytes of data in the MAC are affected. For MAC frames of a same length and a same bit error rate, this data transmission mode causes twice as many MAC frames to be lost as compared to data transmission at the rate of 400 GbE. Lost MAC frames may be indicated by a frame loss ratio (FLR).

Figure 6:
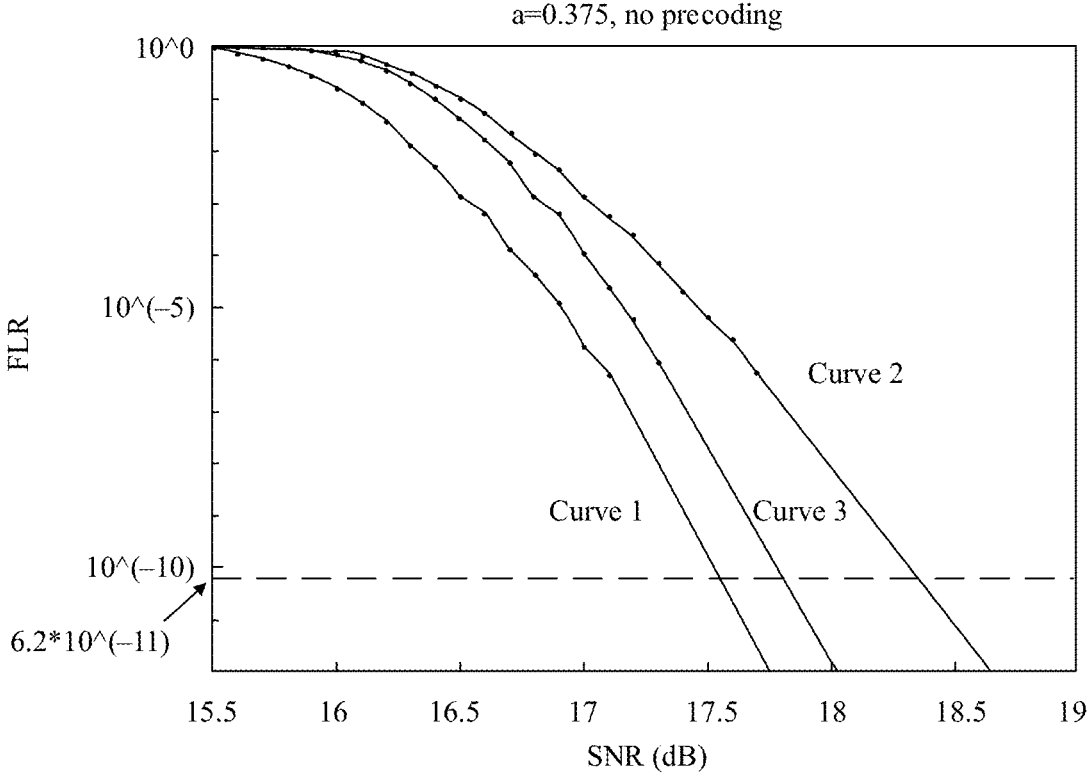
FIG. 6 is a schematic diagram of a relationship between a signal-to-noise ratio and a frame loss ratio according to an embodiment of this application.

If four 25 G data streams used to obtain a 100 G data stream are from a same group of 400 G PCS flows, when a burst error occurs on a link, with reference to a problem of a high FLR, compared with the data transmission at the rate of 400 GbE, performance of this data transmission manner is further degraded. For performance of each data transmission manner, refer to related descriptions in FIG. 6. FIG. 6 is a schematic diagram of a relationship between a signal-to-noise ratio (SNR) and an FLR according to an embodiment of this application. The relationship between the SNR and the FLR may indicate performance of data transmission. When a same FLR needs to be achieved, a higher SNR of required data transmission indicates poorer performance of the data transmission manner. Refer to FIG. 6. A curve 1 shows an SNR-FLR relationship curve of data transmission at the rate of 400 GbE. A curve 2 shows an SNR-FLR relationship of data transmission when four 25 G data streams are from a same group of 400 G PCS flows. A curve 3 shows an SNR-FLR relationship curve of data transmission when the data transmission method provided in embodiments of this application is used. As shown in FIG. 6, when a burst error transfer coefficient a=0.375 and no precoding is performed, if the FLR needs to be $6.2*10^{-11}$, an SNR corresponding to the curve 2 is approximately 18.4 decibels (dB), and an SNR corresponding to the curve 1 is approximately 17.6 dB. The SNR corresponding to the curve 2 is approximately 0.8 dB higher than the SNR corresponding to the curve 1. An SNR corresponding to the curve 3 is approximately 17.8 dB, and the SNR corresponding to the curve 3 is approximately 0.2 dB higher than the SNR corresponding to the curve 1. In other words, if a same FLR needs to be achieved, an SNR of the data transmission required in the method in embodiments of this application is lower than that of transmitting a 100 G data stream obtained based on the four 25 G data streams that belong to the same group of 400 G PCS flows. Therefore, the method can implement data transmission with high error correction performance and a low frame loss ratio.

In addition, in the method provided in embodiments of this application, the second module can directly perform bit multiplexing on any second quantity of third data streams to obtain the fourth data stream, and a plurality of operations do not need to be performed to identify whether the data streams for obtaining the third data streams are transmitted through the virtual lanes belonging to the different virtual lane groups. For example, the second module does not need to perform demultiplexing (demux) on the plurality of third data streams to obtain the plurality of data streams, and then perform AM locking on the plurality of data streams obtained through demultiplexing and identify the plurality of data streams, to determine whether the plurality of data streams are transmitted through the virtual lanes belonging to the different virtual lane groups. Therefore, in the method, design complexity of the second module is low, and a delay is also low.

Figure 7:
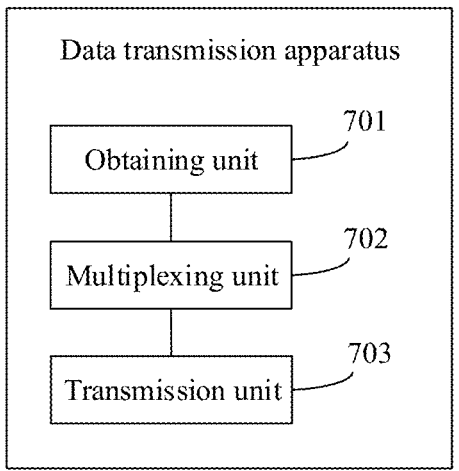
FIG. 7 is a schematic diagram of a structure of a data transmission apparatus according to an embodiment of this application.

An embodiment of this application further provides a data transmission apparatus. FIG. 7 is a schematic diagram of a structure of a data transmission apparatus according to an embodiment of this application. Based on a plurality of units shown in FIG. 7, the data transmission apparatus shown in FIG. 7 can perform all or some operations performed by a first module. It should be understood that the apparatus may include more additional units than the units shown, or may omit some units shown in the apparatus. This is not limited in this embodiment of this application. As shown in FIG. 7, the apparatus includes:

an obtaining unit 701, configured to obtain a plurality of first data streams and a plurality of second data streams, where the first data stream and the second data stream are transmitted through virtual lanes belonging to different virtual lane groups;

a multiplexing unit 702, configured to obtain a plurality of third data streams based on the plurality of first data streams and the plurality of second data streams, where any third data stream is obtained by performing bit multiplexing on a first quantity of first data streams in the plurality of first data streams and a first quantity of second data streams in the plurality of second data streams; and a transmission unit 703, configured to transmit the plurality of third data streams to a second module, to enable the second module to obtain a plurality of fourth data streams based on the plurality of third data streams, where any fourth data stream is obtained by performing bit multiplexing on any second quantity of third data streams in the plurality of third data streams.

In an embodiment, the multiplexing unit 702 is configured to perform bit multiplexing on an $i^{th}$ first data stream in the plurality of first data streams and an $i^{th}$ second data stream in the plurality of second data streams to obtain one third data stream, where $0 \leq i < A$, i is an integer, A is a quantity of first data streams, and a quantity of second data streams is the same as the quantity of first data streams.

In an embodiment, the multiplexing unit 702 is configured to perform bit multiplexing on an $i^{th}$ first data stream in the plurality of first data streams and a $j^{th}$ second data stream in the plurality of second data streams to obtain one third data stream, where $0 \leq i < A$, $0 \leq j < A$, i is not equal to j, both i and j are integers, A is a quantity of first data streams, and a quantity of second data streams is the same as the quantity of first data streams.

In an embodiment, a sum of transmission rates of the plurality of fourth data streams is equal to a reference rate.

In an embodiment, the reference rate is 800 G.

In an embodiment, each of the virtual lane groups for transmitting the plurality of first data streams and the plurality of second data streams is a 400 G PCS lane group.

In an embodiment, a transmission rate of the third data stream is 50 G, and the transmission rate of the fourth data stream is 100 G.

In the apparatus provided in this embodiment of this application, bit multiplexing is performed on the obtained first data streams and the obtained second data streams, so that the third data stream with a high transmission rate can be obtained, and data is transmitted at a high transmission rate. In addition, the third data stream is transmitted to the second module, so that the second module performs bit multiplexing on the third data stream. The apparatus can obtain the fourth data stream with a high transmission rate, that is, a data transmission rate is further improved, and data is transmitted at a high transmission rate.

In addition, in the apparatus provided in this embodiment of this application, bit multiplexing is separately performed based on the first module and the second module to improve the data transmission rate. A transmission rate of a lane of the first module may be low. In this case, the apparatus can be used in a chip with a lane with a low transmission rate. For example, the method is applicable to chips using 50 G/lane signaling.

Figure 8:
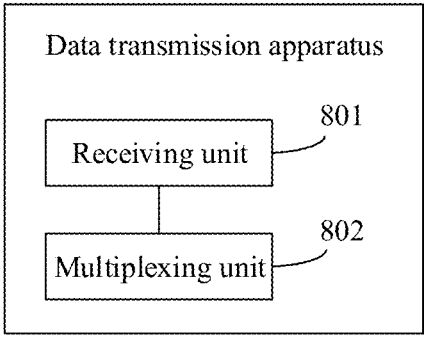
FIG. 8 is a schematic diagram of a structure of another data transmission apparatus according to an embodiment of this application.

FIG. 8 is a schematic diagram of a structure of another data transmission apparatus according to an embodiment of this application. Based on a plurality of units shown in FIG. 8, the data transmission apparatus shown in FIG. 8 can perform all or some operations performed by a second module. It should be understood that the apparatus may include more additional units than the units shown, or may omit some units shown in the apparatus. This is not limited in this embodiment of this application. As shown in FIG. 8, the apparatus includes:

a receiving unit 801, configured to receive a plurality of third data streams transmitted by a first module, where any third data stream is obtained by performing bit multiplexing on a first quantity of first data streams in the plurality of first data streams and a first quantity of second data streams in the plurality of second data streams, and the first data stream and the second data stream are transmitted through virtual lanes belonging to different virtual lane groups; and a multiplexing unit 802, configured to obtain a plurality of fourth data streams based on the plurality of third data streams, where any fourth data stream is obtained by performing bit multiplexing on any second quantity of third data streams in the plurality of third data streams.

The fourth data stream is obtained by performing bit multiplexing on the third data streams. The apparatus provided in this embodiment of this application can obtain the fourth data stream with a high transmission rate, so that a data transmission rate can be improved, and data can be transmitted at a high transmission rate.

In addition, in the apparatus provided in this embodiment of this application, bit multiplexing can be directly performed on any second quantity of third data streams to obtain the fourth data stream, and a plurality of operations do not need to be performed to identify whether the data streams for obtaining the third data streams are transmitted through the virtual lanes belonging to the different virtual lane groups. When high error correction performance and a low frame loss ratio are achieved, design complexity of the apparatus is low, and a delay is also low.

It should be understood that, when the apparatuses provided in FIG. 7 and FIG. 8 implements functions of the apparatuses, division of the foregoing functional units is used as an example for description. During actual application, the foregoing functions may be allocated to different functional units for implementation according to a requirement. That is, an internal structure of the device is divided into different functional units to implement all or some of the functions described above. In addition, the apparatuses provided in the foregoing embodiments and the method embodiments belong to a same concept. Example processes may refer to the method embodiments herein. Details are not described herein again.

Figure 9:
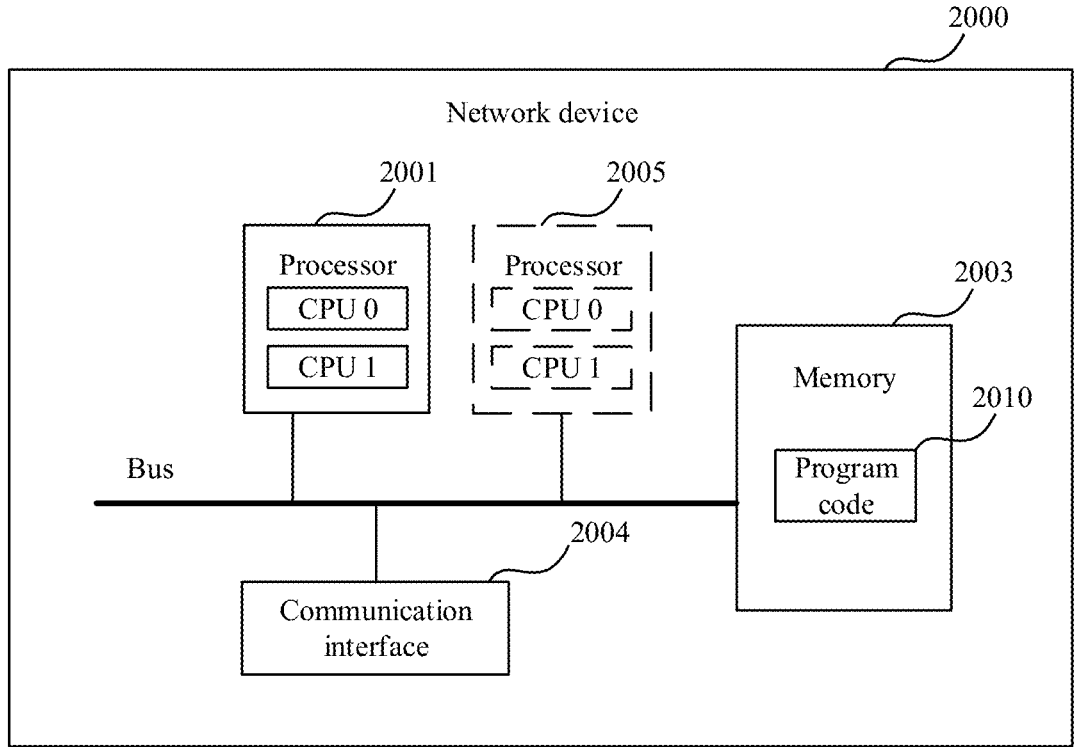
FIG. 9 is a schematic diagram of a structure of a computer system according to an embodiment of this application.

FIG. 9 is a schematic diagram of a structure of a computer system according to an embodiment of this application. For example, as shown in FIG. 9, the computer system is a network device 2000. The network device 2000 shown in FIG. 9 is configured to perform an operation related to the first module or an operation related to the second module in the data transmission method shown in FIG. 2. The network device 2000 is, for example, a server, and the network device 2000 may be implemented by a general bus architecture.

As shown in FIG. 9, the network device 2000 includes at least one processor 2001, a memory 2003, and at least one communication interface 2004.

The processor 2001 is, for example, a central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD), or another programmable logic device, a transistor logic device, a hardware component, or any combination thereof. The PLD is, for example, a complex programmable logic device (CPLD), a field programmable gate array (FPGA), a generic array logic (GAL), or any combination thereof. The processor may implement or execute various logical blocks, modules, and circuits described with reference to the content disclosed in embodiments of this application. Alternatively, the processor may be a combination of processors implementing a computing function, for example, a combination including one or more microprocessors, or a combination of a DSP and a microprocessor.

Optionally, the network device 2000 further includes a bus. The bus is configured to transmit information between components of the network device 2000. The bus may be a peripheral component interconnect (PCI) bus, an extended industry standard architecture (EISA) bus, or the like. Buses may be classified into an address bus, a data bus, a control bus, and the like. For ease of indication, the bus is indicated by using only one bold line in FIG. 9. However, it does not indicate that there is only one bus or only one type of bus.

The memory 2003 may be a read-only memory (ROM) or another type of static storage device capable of storing static information and instructions, or may be a random access memory (RAM) or another type of dynamic storage device capable of storing information and instructions, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer, but is not limited thereto. For example, the memory 2003 exists independently, and is connected to the processor 2001 through the bus. Alternatively, the memory 2003 and the processor 2001 may be integrated together.

The communication interface 2004 is any apparatus such as a transceiver, and is configured to communicate with another device or a communication network. The communication network may be an Ethernet, a radio access network (RAN), a wireless local area network (WLAN), or the like. The communication interface 2004 may include a wired communication interface, and may further include a wireless communication interface. Specifically, the communication interface 2004 may be an Ethernet (Ethernet) interface, a fast Ethernet (FE) interface, a gigabit Ethernet (GE) interface, an asynchronous transfer mode (ATM) interface, a WLAN interface, a cellular network communication interface, or a combination thereof. The Ethernet interface may be an optical interface, an electrical interface, or a combination thereof. In this embodiment of this application, the communication interface 2004 may be used by the network device 2000 to communicate with another device.

In an embodiment, the processor 2001 may include one or more CPUs, for example, a CPU 0 and a CPU 1 shown in FIG. 9. Each of these processors may be a single-core (single-CPU) processor, or may be a multi-core (multi-CPU) processor. The processor herein may be one or more devices, circuits, and/or processing cores configured to process data (for example, computer program instructions).

In an embodiment, the network device 2000 may include a plurality of processors, for example, the processor 2001 and a processor 2005 shown in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

In an embodiment, the network device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, a projector, or the like. The input device communicates with the processor 2001, and may receive an input from a user in a plurality of manners. For example, the input device may be a mouse, a keyboard, a touchscreen device, or a sensing device.

In some embodiments, the memory 2003 is configured to store program code 2010 for executing the solutions of this application, and the processor 2001 may execute the program code 2010 stored in the memory 2003. The program code 2010 may include one or more software modules. Optionally, the processor 2001 may also store program code or instructions for executing the solutions of this application.

In an embodiment, the network device 2000 in this embodiment of this application may include the first module in the foregoing method embodiments. The processor 2001 in the network device 2000 reads the program code 2010 in the memory 2003 or the program code or the instructions stored in the processor 2001, to enable the network device 2000 shown in FIG. 9 to perform all or some operations performed by the first module.

In an embodiment, the network device 2000 in this embodiment of this application may include the second module in the foregoing method embodiments. The processor 2001 in the network device 2000 reads the program code 2010 in the memory 2003 or the program code or the instructions stored in the processor 2001, to enable the network device 2000 shown in FIG. 9 to perform all or some operations performed by the second module.

The network device 2000 may further correspond to the apparatuses shown in FIG. 7 and FIG. 8, and each functional unit in the apparatuses shown in FIG. 7 and FIG. 8 is implemented by software of the network device 2000. In other words, the functional units included in the apparatuses shown in FIG. 7 and FIG. 8 are generated after the processor 2001 of the network device 2000 reads the program code 2010 stored in the memory 2003.

The operations of the data transmission method shown in FIG. 2 are completed by an integrated logic circuit of hardware in the processor of the network device 2000 or instructions in a form of software. The operations of the methods disclosed with reference to embodiments of this application may be directly performed and completed by a hardware processor, or may be performed and completed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory, and completes the operations of the foregoing methods in combination with hardware of the processor. To avoid repetition, details are not described herein again.

Figure 10:
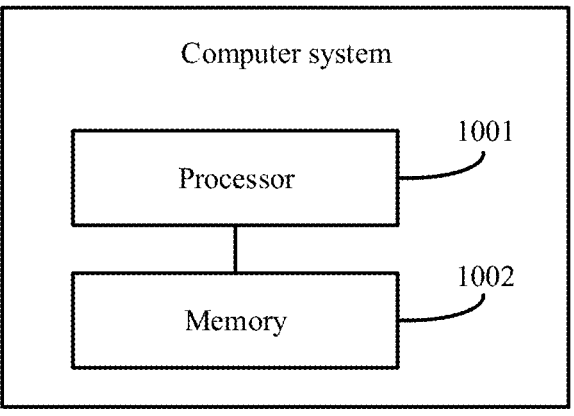
FIG. 10 is a schematic diagram of a structure of another computer system according to an embodiment of this application.

FIG. 10 is a schematic diagram of a structure of another computer system according to an embodiment of this application. The computer system is configured to perform an operation related to the first module or an operation related to the second module in the data transmission method shown in FIG. 2. For example, the computer system is a server. The server may vary greatly due to different configurations or performance. The computer system may include one or more processors 1001 and one or more memories 1002. The one or more memories 1002 store at least one computer program, and the at least one computer program is loaded and executed by the one or more processors 1001. For example, the processor 1001 is a CPU. Certainly, the computer system may further include components such as a wired or wireless network interface, a keyboard, and an input/output interface, to perform input/output. The computer system may further include another component configured to implement a device function. Details are not described herein.

An embodiment of this application further provides a computer system. The computer system includes a processor. The processor is configured to invoke, from a memory, instructions stored in the memory and run the instructions, to enable the computer system to implement any one of the foregoing data transmission methods.

In an embodiment, the computer system further includes an input interface, an output interface, and the memory. The input interface, the output interface, the processor, and the memory are connected through an internal connection path.

An embodiment of this application further provides a data transmission system. The data transmission system includes a first module and a second module. The first module is configured to perform the method performed by the first module shown in FIG. 2, and the second module is configured to perform the method performed by the second module shown in FIG. 2. For functions of the first module and the second module in the data transmission system, refer to related descriptions shown in FIG. 2. Details are not described herein again.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform the data transmission method.

It should be understood that the processor may be a CPU, or may be another general-purpose processor, a DSP, an ASIC, an FPGA, or another programmable logic device, a discrete gate or a transistor logic device, a discrete hardware component, or the like. The general-purpose processor may be a microprocessor or any conventional processor or the like. It should be noted that the processor may be a processor that supports an advanced reduced instruction set computer machines (advanced reduced instruction set computer (RISC) machines (ARMs)) architecture.

Further, in an embodiment, the memory may include a read-only memory and a random access memory, and provide instructions and data for the processor. The memory may further include a non-volatile random access memory. For example, the memory may further store information about a device type.

The memory may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EE-PROM), or a flash memory. The volatile memory may be a random access memory (RAM), and serves as an external cache. Through illustrative but not limited description, many forms of RAMs are available, for example, a static RAM (SRAM), a dynamic RAM (DRAM), a synchronous DRAM (SDRAM), a double data rate SDRAM (DDR-SDRAM), an enhanced SDRAM (ESDRAM), a synchlink DRAM (SL-DRAM), and a direct rambus RAM (DR RAM).

An embodiment of this application further provides a computer-readable storage medium. The computer-readable storage medium stores at least one instruction, and the at least one instruction is loaded and executed by a processor, to enable a computer to implement any one of the foregoing data transmission methods.

An embodiment of this application further provides a computer program (product). When the computer program is executed by a computer, a processor or the computer may be enabled to perform corresponding operations and/or procedures in the foregoing method embodiments.

An embodiment of this application further provides a chip. The chip includes a processor. The processor is configured to run program instructions or code, to enable a device including the chip to perform any one of the foregoing data transmission methods.

For example, the chip further includes an input interface, an output interface, and a memory. The input interface, the output interface, the processor, and the memory are connected through an internal connection path, and the memory includes the program instructions or the code.

All or a part of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium (for example, a solid state disk (SSD)), or the like.

In the foregoing embodiments, a unit of the transmission rate is gigabit per second (gigabit per second, Gb/s), which may also be referred to as G for short. For example, the rate 400 Gb/s may also be referred to as 400 G for short.

To clearly describe the interchangeability of hardware and software, the operations and composition of embodiments have been generally described in the foregoing descriptions in terms of functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

Computer program code used to implement the method in embodiments of this application may be written in one or more programming languages. The computer program code may be provided for a processor of a general-purpose computer, a dedicated computer, or another programmable data transmission apparatus, so that when the program code is executed by the computer or another programmable data transmission apparatus, a function/an operation specified in the flowchart and/or the block diagram is implemented. The program code may be executed entirely on a computer, partly on a computer, as a standalone software package, partly on a computer and partly on a remote computer, or entirely on a remote computer or a server.

In the context of embodiments of this application, computer program code or related data may be carried in any appropriate carrier, so that the device, the apparatus, or the processor can perform various types of processing and operations described above. Examples of the carrier include a signal, a computer-readable medium, and the like. Examples of the signal may include an electrical signal, an optical signal, a radio signal, a voice signal, or other forms of propagated signals, such as a carrier wave and an infrared signal.

It can be clearly understood by a person skilled in the art that, for the purpose of convenient and brief description, for a detailed working process of the foregoing system, device, and module, refer to a corresponding process in the foregoing method embodiments. Details are not described herein again.

In the several embodiments provided in this application, it should be understood that the disclosed system, device, and method may be implemented in other manners. For example, the described device embodiment is an example. For example, division of modules is division of logical functions and there may be other division modes during actual application. For example, a plurality of modules or components may be combined or may be integrated to another system, or some characteristics may be ignored or not executed. In addition, the displayed or discussed mutual couplings or direct couplings or communication connections may be indirect couplings or communication connections implemented by some interfaces, devices, or modules, or may be electrical, mechanical, or other forms of connection.

The modules described as separate parts may or may not be physically separate, and parts displayed as modules may or may not be physical modules, for example, may be located at one position, or may be distributed on a plurality of network modules. Some or all of the modules may be selected based on actual requirements to implement the objectives of the solutions of embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

In this application, terms such as "first" and "second" are used to distinguish between same items or similar items that have basically same functions. It should be understood that there is no logical or time sequence dependency between "first", "second", and "n$^{th}$", and a quantity and an execution sequence are not limited. It should also be understood that although the following description uses terms such as "first" and "second" to describe various elements, these elements should not be limited by the terms. These terms are simply used to distinguish one element from another. For example, a first module may be referred to as a second module without departing from the scope of the various described examples, and similarly, a second module may be referred to as a first module.

It should be further understood that, in embodiments of this application, sequence numbers of the processes do not mean execution sequences. The execution sequences of the processes should be determined based on functions and internal logic of the processes, and should not be construed as any limitation on implementation processes of embodiments of this application.

In this application, the term "at least one" means one or more, and the term "a plurality of" in this application means two or more. For example, a plurality of code blocks means two or more code blocks. The terms "system" and "network" are often used interchangeably herein.

It should be understood that the terms used in the descriptions of the various examples herein are intended to describe specific examples and are not intended to impose a limitation. The terms "one" ("a" and "an") and "the" of singular forms used in the descriptions of the various examples and the appended claims are also intended to include plural forms, unless otherwise specified in the context clearly.

It should further be understood that the term "include" (also referred to as "includes", "including", "comprises", and/or "comprising") used in this specification specifies presence of the stated features, integers, operations, operations, elements, and/or components, with presence or addition of one or more other features, integers, operations, operations, elements, components, and/or their components not excluded.

It should also be understood that, depending on the context, the phrase "if it is determined . . . " or "if [a stated condition or event] is detected" may be interpreted to mean "once determining" or "in response to determining . . . " or "once detecting [the stated condition or event]" or "in response to the detection of [the stated condition or event]".

It should be understood that determining B based on A does not mean that B is determined based only on A, and B may also be determined based on A and/or other information.

It should be further understood that "an embodiment", "an embodiment", and "a possible implementation" mentioned throughout the specification mean that a specific feature, structure, or characteristic related to the embodiment or an implementation is included in at least one embodiment of this application. Therefore, "in one embodiment" or "in an embodiment" or "a possible implementation" appearing throughout the specification may not necessarily refer to a same embodiment. In addition, these particular features, structures, or characteristics may be combined in one or more embodiments in any appropriate manner.

What is claimed is:

1. A method for data transmission, the method comprising:

obtaining, by a first data transmission apparatus through virtual lanes belonging to different virtual lane groups, a plurality of first data streams and a plurality of second data streams;

obtaining a plurality of third data streams based on the plurality of first data streams and the plurality of second data streams, wherein any of the plurality of third data streams is obtained by performing bit multiplexing on a first quantity of first data streams in the plurality of first data streams and a first quantity of second data streams in the plurality of second data streams; and transmitting the plurality of third data streams to a second data transmission apparatus, to enable the second data transmission apparatus to obtain a plurality of fourth data streams based on the plurality of third data streams, wherein any of the plurality of fourth data streams is obtained by performing bit multiplexing on any second quantity of third data streams in the plurality of third data streams.

2. The method according to claim 1, wherein the obtaining a plurality of third data streams based on the plurality of first data streams and the plurality of second data streams comprises:

performing bit multiplexing on an i$^{th}$ first data stream in the plurality of first data streams and an i$^{th}$ second data stream in the plurality of second data streams to obtain one third data stream, wherein $0 \leq i < A$, i is an integer, A is a quantity of the first data streams, and a quantity of the second data streams is the same as the quantity of the first data streams.

3. The method according to claim 1, wherein the obtaining a plurality of third data streams based on the plurality of first data streams and the plurality of second data streams comprises:

performing bit multiplexing on an i$^{th}$ first data stream in the plurality of first data streams and a j$^{th}$ second data stream in the plurality of second data streams to obtain one third data stream, wherein $0 \leq i < A$, $0 \leq j < A$, i is not equal to j, both i and j are integers, A is a quantity of the first data streams, and a quantity of the second data streams is the same as the quantity of the first data streams.

4. The method according to claim 1, wherein a sum of transmission rates of the plurality of fourth data streams is equal to a reference rate.

5. The method according to claim 4, wherein the reference rate is 800 gigabits per second.

6. The method according to claim 4, wherein each of the virtual lane groups for transmitting the plurality of first data streams and the plurality of second data streams is a 400 gigabits-per-second physical coding sublayer lane group.

7. The method according to claim 1, wherein a transmission rate of the third data stream is 50 gigabits per second, and the transmission rate of the fourth data stream is 100 gigabits per second.

8. A first data transmission apparatus, wherein the apparatus comprises:

a communication interface configured to obtain a plurality of first data streams and a plurality of second data streams through virtual lanes belonging to different virtual lane groups; and a processor configured to:

obtain a plurality of third data streams based on the plurality of first data streams and the plurality of second data streams, wherein any of the plurality of third data streams is obtained by performing bit multiplexing by a multiplexing unit on a first quantity of first data streams in the plurality of first data streams and a first quantity of second data streams in the plurality of second data streams; and transmit the plurality of third data streams to a second data transmission apparatus, to enable the second transmission apparatus to obtain a plurality of fourth data streams based on the plurality of third data streams, wherein any of the plurality of fourth data streams is obtained by performing bit multiplexing on any second quantity of third data streams in the plurality of third data streams.

9. The apparatus according to claim 8, wherein the multiplexing unit is configured to perform bit multiplexing on an $i^{th}$ first data stream in the plurality of first data streams and an $i^{th}$ second data stream in the plurality of second data streams to obtain one third data stream, wherein $0 \le i < A$, i is an integer, A is a quantity of the first data streams, and a quantity of the second data streams is the same as the quantity of the first data streams.

10. The apparatus according to claim 8, wherein the multiplexing unit is configured to perform bit multiplexing on an $i^{th}$ first data stream in the plurality of first data streams and a $j^{th}$ second data stream in the plurality of second data streams to obtain one third data stream, wherein $0 \le i < A$, $0 \le j < A$, i is not equal to j, both i and j are integers, A is a quantity of the first data streams, and a quantity of the second data streams is the same as the quantity of the first data streams.

11. The apparatus according to claim 8, wherein a sum of transmission rates of the plurality of fourth data streams is equal to a reference rate.

12. The apparatus according to claim 11, wherein the reference rate is 800 gigabits per second.

13. The apparatus according to claim 12, wherein each of the virtual lane groups for transmitting the plurality of first data streams and the plurality of second data streams is a 400 gigabits-per-second physical coding sublayer lane group.

14. The apparatus according to claim 8, wherein a transmission rate of the third data stream is 50 gigabits per second, and the transmission rate of the fourth data stream is 100 gigabits per second.

15. A second data transmission apparatus comprising:

a communication interface configured to receive a plurality of third data streams transmitted by a first data transmission apparatus, wherein any of the plurality of third data streams is obtained by performing bit multiplexing on a first quantity of first data streams in a plurality of first data streams and a first quantity of second data streams in a plurality of second data streams, and the first data stream and the second data stream are transmitted through virtual lanes belonging to different virtual lane groups; and a processor configured to obtain a plurality of fourth data streams based on the plurality of third data streams, wherein any of the plurality of fourth data streams is obtained by performing bit multiplexing on any second quantity of third data streams in the plurality of third data streams.

16. The apparatus according to claim 15, wherein the virtual lane groups comprise physical coding sublayer (PCS) lane group or forwarding error correction (FEC) lane group.

17. The apparatus according to claim 15, wherein the first data transmission apparatus is a host chip, and the second data transmission apparatus is outside of the host chip.

18. The apparatus according to claim 17, wherein the second data transmission apparatus is an optical module or a clock data recovery (CDR) chip.

19. The apparatus according to claim 15, wherein the first data transmission apparatus and the second data transmission apparatus are communicatively connected through a physical lane.

20. The apparatus according to claim 19, wherein the physical lane comprises an attachment unit interface (AUI).

* * * * *